(12) United States Patent
McKiernan

(10) Patent No.: US 9,151,420 B2
(45) Date of Patent: Oct. 6, 2015

(54) TUBE OR PIPE CLAMP

(75) Inventor: Kevin McKiernan, Hillsborough, NJ (US)

(73) Assignee: ENGINEERED PRODUCT SUPPLY, LLC, Branchville, NJ (US)

(*) Notice: Subject to any disclaimer, the term of this patent is extended or adjusted under 35 U.S.C. 154(b) by 0 days.

(21) Appl. No.: 13/429,813

(22) Filed: Mar. 26, 2012

(65) Prior Publication Data

US 2013/0249212 A1 Sep. 26, 2013

(51) Int. Cl.
*F16L 23/00* (2006.01)
*F16L 23/04* (2006.01)
*F16L 23/10* (2006.01)

(52) U.S. Cl.
CPC *F16L 23/04* (2013.01); *F16L 23/10* (2013.01)

(58) Field of Classification Search
CPC ........... F16L 23/04; F16L 23/06; F16L 23/10; F16L 33/12; F16L 37/20
USPC ............. 285/364, 406, 411, 414, 283; 16/263
See application file for complete search history.

(56) References Cited

U.S. PATENT DOCUMENTS

| | | | | |
|---|---|---|---|---|
| 2,797,433 | A | * | 7/1957 | Hager, Jr. .......................... 16/381 |
| 4,919,453 | A | * | 4/1990 | Halling et al. ..................... 285/3 |
| 5,873,611 | A | * | 2/1999 | Munley et al. ................ 285/367 |
| 6,708,377 | B2 | | 3/2004 | Maunder |
| 7,384,078 | B2 | | 6/2008 | Cobb et al. |
| 7,883,121 | B2 | | 2/2011 | Henry |

* cited by examiner

*Primary Examiner* — Daniel P Stodola
*Assistant Examiner* — Gwendolyn Driggers
(74) *Attorney, Agent, or Firm* — R. Neil Sudol; Henry D. Coleman

(57) ABSTRACT

A tube or pipe clamp has two clamp members that are pivotably connected to one another at respective hinge-forming ends thereof. The tube or pipe clamp has a locking device that includes a shaft and a locking element operatively attached to the shaft, the shaft being pivotably attached to one of the clamp members. The other clamp member has a pair of prongs defining a slot for receiving the shaft of the locking device, the locking element being engageable with the prongs to lock the clamp members to one another at ends thereof opposite the hinge-forming ends. The prongs each have at least one projection on a side facing away from the one clamp member. Each of the projections is disposed proximate the free end of the respective prong.

16 Claims, 4 Drawing Sheets

TUBE OR PIPE CLAMP

BACKGROUND OF THE INVENTION

This invention relates to tube or pipe clamps.

Tube clamps are used extensively in industry to fixedly attached two adjacent tubes end to end in a flanged ferrule tube connection. The ferrules have angled (conical) surfaces. A tube clamp captures the ferrules and contacts them on the conical faces. By clamping the clamp diametrically, the contact on the angled surfaces causes a linear force component to squeeze the ferrules together in a direction that squeezes a gasket disposed between them.

Industry has various problems with this type of clamp, including loosening of the wing nuts, causing them to sometimes swing open.

Participants in the industry and industry standards-creating bodies have attempted to solve this problem by introduction of standard component configurations and new products. Products include metal-to-metal ferrules with fixed gasket space, various durometer gaskets, hard gaskets, gasket appendages to achieve fixed ferrule-to-ferrule distance, torque-limiting nuts and live load nuts.

OBJECTS OF THE INVENTION

It is an object of the present invention to provide an improved tube or pipe clamp of the above-described type.

A more particular object of the present invention is to provide a tube or pipe clamp wherein the chances of inadvertent clamp opening is reduced.

These and other objects of the present invention will be apparent from the descriptions and drawings herein. Although every object of the invention is attainable by at least one embodiment of the invention, there is not necessarily any single embodiment that achieves all of the objects of the invention.

SUMMARY OF THE INVENTION

A tube or pipe clamp in accordance with the present invention comprises two clamp members pivotably connected to one another at respective hinge-forming ends thereof. The tube or pipe clamp also comprises a locking device which includes a shaft and a locking element operatively attached to the shaft, the shaft being pivotably attached to one of the clamp members. The other clamp member has a pair of prongs defining a slot for receiving the shaft of the locking device, the locking element being engageable with the prongs to lock the clamp members to one another at ends thereof opposite the hinge-forming ends. The prongs each have at least one projection on a side facing away from the one clamp member. Each of the projections is disposed proximate the free end of the respective prong.

The projections are small relative to the prongs and can be described as beads, nubs, or truncated teeth. The projections prevent an inadvertent opening and disengagement of the clamp upon a slight loosening of the locking device. Where the shaft is a bolt and the locking element is a nut (e.g., wing nut) loosening may result in part from a limited unthreading of the nut relative to the bolt. In specific scenario, when ferrules are forced together by other forces, such as expansion of the connected tubes, the top and bottom clamp halves can close toward each other, releasing tension on the bolt, regardless of whether it has unthreaded or not. This does then remove friction at the face of the nut, allowing it to also unthread.

The clamp member with the prongs also includes a first main section and a first hinge-forming portion. The main section of the clamp member has a substantially semi-circular or semi-cylindrical concave surface conforming to an outer tube dimension. The hinge-forming portion extends outwardly from the main section on a side thereof opposite the prongs.

The clamp member to which the shaft of the locking device is pivotably attached includes a second main section, at least one flange, and a second hinge-forming portion. Like the main section of the prongs-bearing clamp member, the second main section has a substantially semi-circular or semi-cylindrical concave surface conforming to an outer tube dimension. The flange extends outwardly from an end of the second main section opposite the second hinge-forming portion. The shaft of the locking device is pivotably attached to the flange.

In a tube or pipe clamp in accordance with the present invention, the flange is one of a pair of parallel flanges. The shaft is partially disposed and movable in a space between the flanges.

Pursuant to another feature of the present invention, each of the projections is located at a tip of the respective prong. The projections typically have a squat rectangular prismatic form. Optionally, one or more edges may be beveled or rounded.

Pursuant to an additional feature of the present invention, the hinge of the clamp includes a hinge pin connected to the clamp members at the hinge-forming ends thereof. The hinge pin includes a male pin member and a female pin member, each having a shaft and a head. The shaft of the male pin member has a stepped outer diameter with a larger diameter section proximate the head. The shaft of the female pin member is hollow with an inner-diameter segment at a free end of the shaft, opposite the second head, that is larger than an inner-diameter segment at the head end of the shaft. The shaft of the male pin member is formed in an external surface with a groove extending over a portion of the larger diameter section and to a free end of the shaft. The hinge-forming ends of the clamp members include eyelet portions juxtaposed to one another so that respective eyelets are mutually aligned, with the hinge pin extending through the eyelets.

Preferably, the larger diameter section of the male pin member's shaft and the larger inner diameter section of the female pin member have approximately the same diameter to thereby enable a force-lock or interference fit of the male pin member and the female pin member to one another. The same relationship may apply for the smaller diameter section of the male pin member's shaft matching the smaller inner diameter section of the female pin member.

More specifically, the stepped outer diameter of the male pin member's shaft comprises exactly two sections of respective outer diameters which include the larger diameter section and a smaller diameter section at a free end of the male pin member's shaft. The shaft of the female pin member has exactly two inner diameter sections including the larger inner-diameter section and a smaller inner-diameter section on a side of the larger inner-diameter section opposite the free end of the female pin member's shaft. Preferably, the larger diameter section of the male pin member's shaft is axially substantially shorter than the smaller diameter section and the larger inner-diameter segment of the female pin member is axially substantially longer than the smaller inner-diameter segment.

A tube or pipe clamp member in accordance with the present invention comprises a main section having a substantially semi-circular or semi-cylindrical concave surface facing in a first direction and conforming to an outer tube dimension. A pair of prongs extend outwardly from one end of the main section and define a slot for receiving a shaft of a locking device, the slot being open at free ends of the prongs spaced from the one end of the main section. A hinge portion extends outwardly from another end of the main section opposite the prongs. The prongs each have at least one projection on a side facing in a second direction substantially opposite the first direction. Each projection is disposed proximate the free end of the respective one of the prongs.

DETAILED DESCRIPTION

Figure 1:
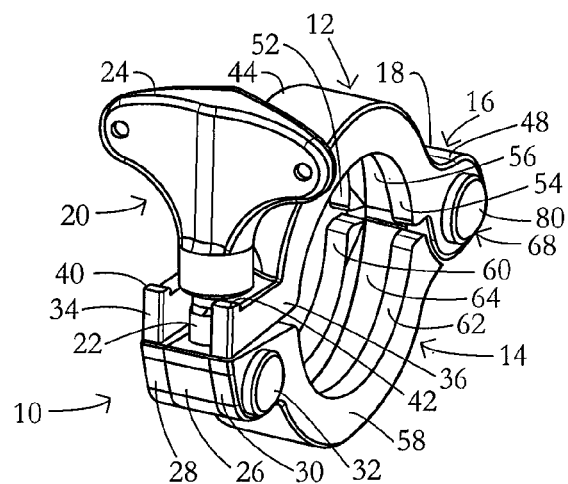
FIG. 1 is a top, front, and left side perspective view of a tube or pipe clamp in accordance with the present invention.
Figure 2:
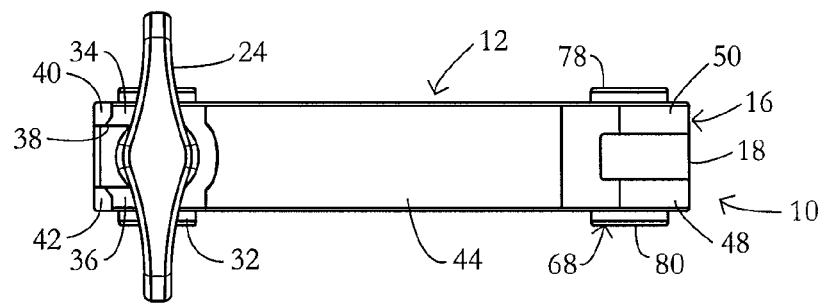
FIG. 2 is a top plan view of the tube or pipe clamp of FIG. 1, on a larger scale.
Figure 3:
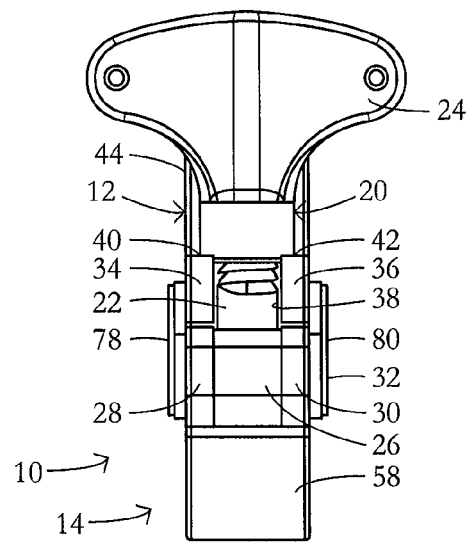
FIG. 3 is a front elevational view of the tube or pipe clamp of FIGS. 1 and 2, on a still larger scale.
Figure 4:
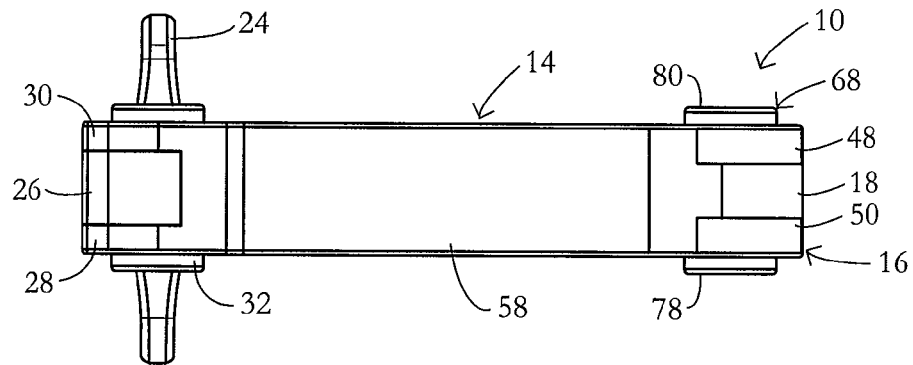
FIG. 4 is a bottom plan view of the tube or pipe clamp of FIGS. 1-3, on a large scale.
Figure 5:
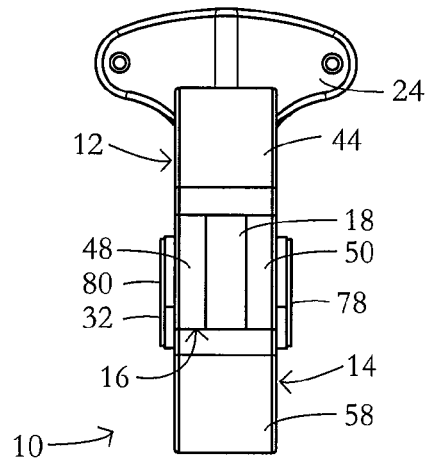
FIG. 5 is a rear elevational view of the tube or pipe clamp of FIGS. 1-4, on a smaller scale.
Figure 6:
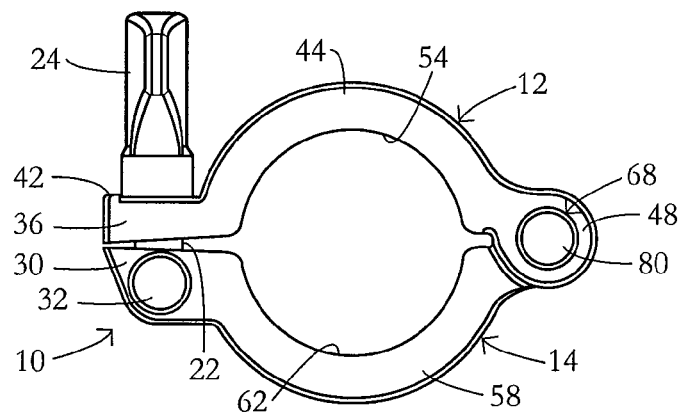
FIG. 6 is a left side elevational view of the tube or pipe clamp of FIGS. 1-5, on a small scale.
Figure 7:
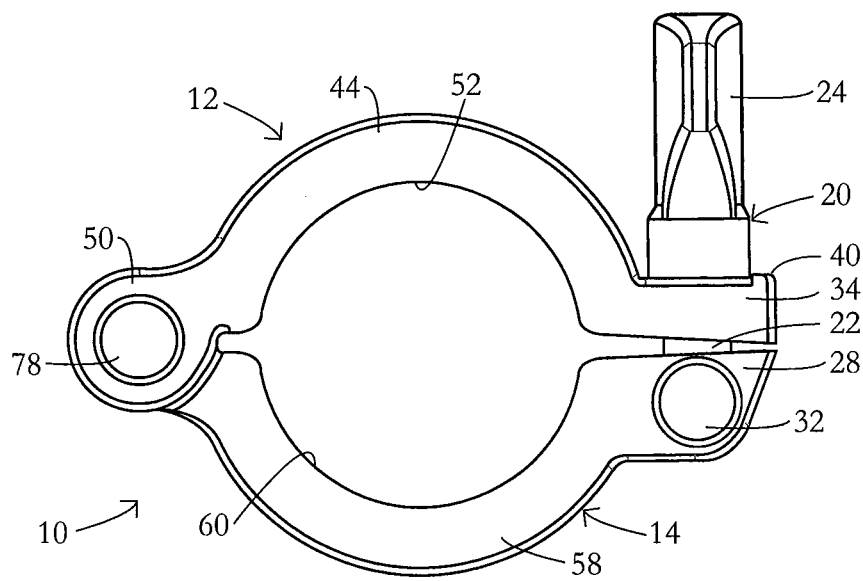
FIG. 7 is a right side elevational view of the tube or pipe clamp of FIGS. 1-6, on a larger scale.
Figure 8:
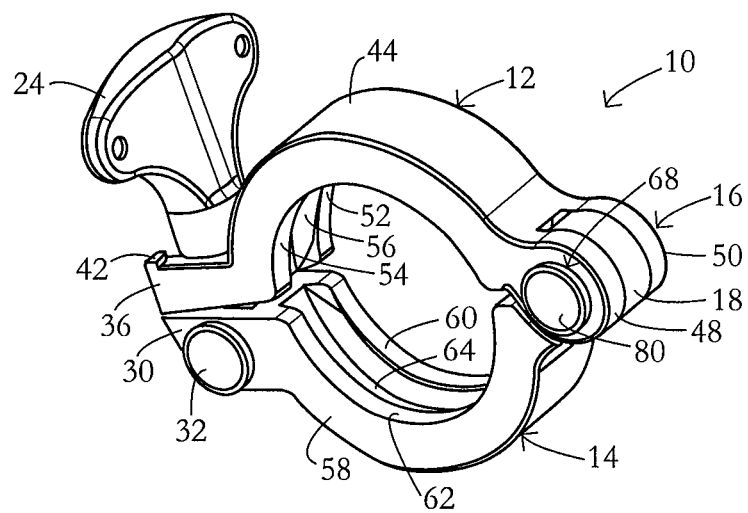
FIG. 8 is a top, rear, and left side perspective view of the tube or pipe clamp of FIGS. 1-7, on a smaller scale.
Figure 9:
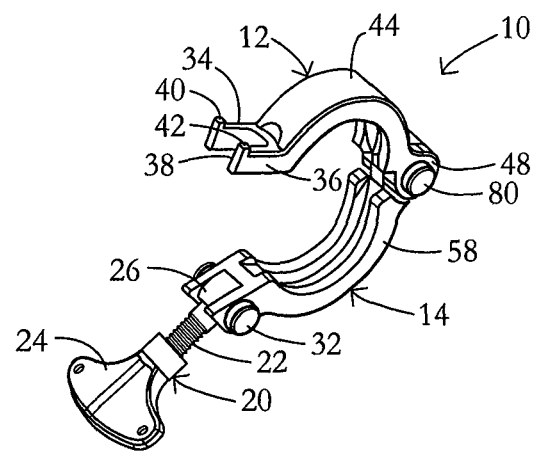
FIG. 9 is a top, front, and left side perspective view, on a small scale, of the tube or pipe clamp of FIGS. 1-8, showing the tube or pipe clamp in an open configuration.

A tube or pipe clamp 10 includes an upper clamp half or member 12 and a lower clamp half or member 14. Clamp members 12 and 14 are pivotably connected to one another at respective hinge-forming ends 16, 18 thereof. Tube or pipe clamp 10 also includes a locking device 20, which comprises a shaft 22 specifically in the form of a bolt and a locking element 24 specifically in the form of a wing nut.

Shaft or bolt 22 is pivotably attached to a lower one 14 of the clamp members 12, 14. More specifically, bolt 22 is anchored to or embedded in a base plate 26 that is slidably ensconced in a space (not separately designated) between two mutually parallel flanges 28 and 30 on a side of lower clamp member 14 opposite hinge-forming end 18. Base plate 26 and accordingly bolt 22 are swingably mounted to flanges 28 and 30 via a pivot pin 32 (only head portions are visible).

Upper clamp member 12 has a pair of prongs 34 and 36 disposed in coplanar alignment with respective flanges 28 and 30 in a closed configuration of clamp 10. Prongs 34 and 36 define a slot 38 for receiving bolt 22. Wing nut 24 is engageable with prongs 28 and 30 in the closed clamp configuration to lock clamp members 12 and 14 to one another. Prongs 34 and 36 are each provided at a free end or distal tip with a respective projection 40 and 42 that is disposed on an upper side of the prong, that is, on a side facing away from lower clamp member 14. Each projection 40 and 42 is disposed proximate the free end of the respective prong 34 and 36 and preferably at the very distal tip thereof.

Projections 40 and 42 are small relative to prongs 34 and 36 and are in the nature of prismatic beads, nubs, or truncated teeth. Projections 40 and 42 prevent an inadvertent opening and disengagement of clamp 10 upon a slight loosening of locking device 20, resulting, for instance, from wing nut 24 being nudged during maintenance activity and unthreading relative to bolt 22.

Upper clamp member 12 includes a substantially semi-circular or semi-cylindrical main section 44 and hinge-forming portion 16 that comprises a pair of flanges or leaves 48 and 50. Main section 44 has a pair of substantially semi-circular or semi-cylindrical concave surfaces 52 and 54 conforming to outer tube dimensions and flanking a groove 56 that receives two juxtaposed tube flanges (not shown) when clamp 10 is used at the junction between two tube sections to hold the tube sections to one another.

Lower clamp member 14 includes a substantially semi-circular or semi-cylindrical main section 58, with flanges 28 and 30 on one side and hinge-forming portion 18 on an opposite side. Like main section 44 of upper clamp member 12, main section 58 of lower clamp member 14 has a pair of substantially semi-circular or semi-cylindrical concave surfaces 60 and 62 conforming to outer tube dimensions and flanking a groove 64 that receives a portion of the same tube flange(s) received by groove 56 when clamp 10 is used at the junction between two tube sections. Hinge-forming end portion 18 comprises a single leaf that is slidably inserted between leaves 48 and 50 of hinge-forming portion 16 of the upper clamp member 12.

Figure 10:
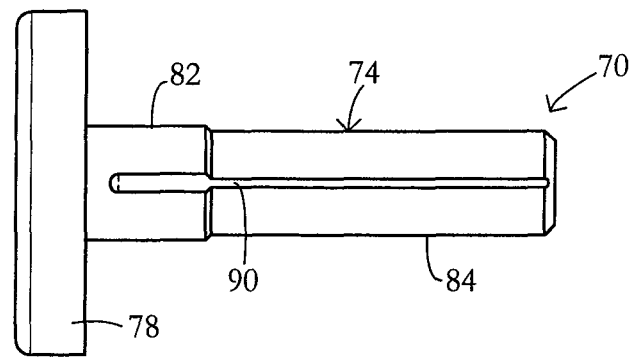
FIG. 10 is a side elevational view of a male member of a hinge pin assembly utilizable in the tube or pipe clamp of FIGS. 1-9.
Figure 11:
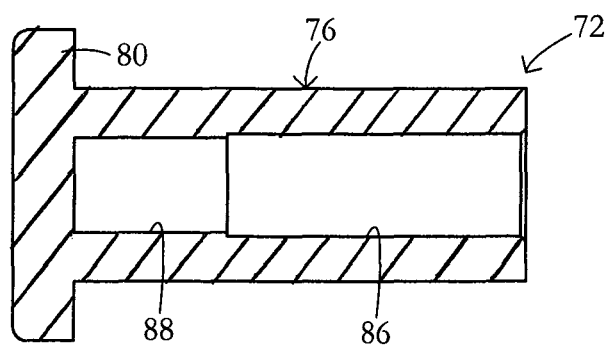
FIG. 11 is a longitudinal cross-sectional view of a female member of a hinge pin assembly, that is matable with the male member of FIG. 10.

Hinge-forming end portions 16 and 18 are formed with respective eyelets that align to receive a hinge pin 68. Pin 68 includes a male pin member 70 shown in FIG. 10 and a female pin member 72 shown in FIG. 11. Each pin member 70, 72 has a shaft 74, 76 and a head 78, 80. Male pin member shaft 74 has a stepped outer diameter with a larger diameter section 82 proximate the head 78 and a smaller-diameter section 84 at a free end of the shaft. Female pin member shaft 76 is hollow with an inner-diameter segment 86 at a free end of the shaft, opposite head 80, that is larger than an inner-diameter segment 88 at the head end of the shaft. Male pin member 70 is formed in an external surface (not separately designated) with a groove 90 extending over a portion of the larger diameter section 82 and across smaller-diameter section 84 to a free end of shaft 74.

Larger diameter section 82 of shaft 74 of male pin member 70 and larger inner diameter segment 86 of the female pin member 72 have approximately the same diameter, and likewise smaller diameter section 84 of male pin shaft 74 and smaller inner-diameter segment 88 of female pin member 72 have approximately the same diameter, to thereby enable a force-lock or interference fit of male pin member 70 and female pin member 72 to one another. Larger diameter section 82 of male pin shaft 74 is axially substantially shorter (has a smaller axial length) than smaller diameter section 84, while larger inner-diameter segment 86 of female pin member 72 is axially substantially shorter than smaller inner-diameter segment 88, so that the force-lock or interference fit occurs only at the ends of the assembled pin 68.

Pin members 70 and 72 slide together easily without interference until male pin member shaft 74 first reaches smaller inner-diameter segment 88 of female pin member shaft 76. Then after further pushing, larger diameter section 82 of male pin member shaft 74 will contact the inner-diameter segment 88 of female pin member shaft 76 with a slight interference fit. The result is an interference fit at each end, but not along the entire length of pin 68, so that the force to assemble the pin is minimized, but there is a solid connection at both ends. Groove 90 allows an air pressure release, which facilitates the assembly of pin 68.

Although the invention has been described in terms of particular embodiments and applications, one of ordinary skill in the art, in light of this teaching, can generate additional embodiments and modifications without departing from the spirit of or exceeding the scope of the claimed invention. It is to be understood, for instance, that the tube clamp of the present invention can be used to connect metal pipe sections as well as plastic tubes. Thus, the word "tube" as used herein generally means "tubular member" and encompasses plastic tubes and metal pipes. Accordingly, it is to be understood that the drawings and descriptions herein are proffered by way of example to facilitate comprehension of the invention and should not be construed to limit the scope thereof.

What is claimed is:

1. A tube or pipe clamp comprising:
two clamp members pivotably connected to one another at respective hinge-forming ends thereof; and
a locking device including a shaft and a locking element operatively attached to said shaft, said shaft being pivotably attached to one of said clamp members,
the other of said clamp members having a pair of prongs defining a slot for receiving said shaft so that said locking element is engageable with said prongs to lock said clamp members to one another at ends thereof opposite said hinge-forming ends,
further comprising a hinge pin connected to said clamp members at said hinge-forming ends, said hinge pin including a male pin element and a female pin element, said male pin element having a first shaft and a first head, said first shaft having a stepped outer diameter with a larger diameter section proximate said head, said female pin element having a second shaft and a second head, said second shaft being hollow with a larger inner-diameter section at a free end of said second shaft opposite said second head, said first shaft being inserted into and disposed within said second shaft,
said first shaft having exactly two sections of respective outer diameters including said larger diameter section and a smaller diameter section at a free end of said first shaft, said second shaft having exactly two inner diameter segments including said larger inner-diameter section and a smaller inner-diameter segment on a side of said larger inner-diameter section opposite the free end of said second shaft,
said first shaft being formed in an external surface with a groove extending longitudinally over a portion of said larger diameter section and across the smaller diameter section to a free end of said first shaft, said groove allowing an air pressure release which facilitates assembly of the first and second shaft;
wherein said first shaft and said second shaft are free of threading; and
wherein said male pin element and said female pin element are secured to one another only by a friction or interference fit and only at said free end of said first shaft and an end opposite said free end of said first shaft and at said free end of said second shaft and an end opposite said free end of said second shaft.

2. The tube or pipe clamp of claim 1 wherein said other of said clamp members includes a first main section, said prongs, and a first hinge-forming portion, said main section having a substantially semi-circular or semi-cylindrical concave surface conforming to an outer tube dimension, said hinge-forming portion extending outwardly from said main section on a side thereof opposite said prongs; said one of said clamp members including a second main section, at least one flange, and a second hinge-forming portion, said second main section having a substantially semi-circular or semi-cylindrical concave surface conforming to an outer tube dimension, said at least one flange extending outwardly from an end of said second main section opposite said second hinge-forming portion, said shaft of said locking device being pivotably attached to said at least one flange.

3. The tube or pipe clamp of claim 2 wherein said flange is one of a pair of parallel flanges, said shaft being movable in a space between said flanges.

4. The tube or pipe clamp of claim 3 wherein said shaft takes the form of a bolt and said closure element taking the form of a nut.

5. The tube or pipe clamp of claim 4 wherein closure element is a wing nut.

6. The tube or pipe clamp of claim 1 wherein said prongs each have at least one projection on a side facing away from said one of said clamp members, each said projection being disposed proximate the free end of the respective one of said prongs, each said projection taking the form of a nub or truncated tooth.

7. The tube or pipe clamp of claim 6 wherein each said projection is located at a tip of the respective one of said prongs.

8. The tube or pipe clamp of claim 1 wherein said hinge-forming ends include eyelet portions juxtaposed so that respective eyelets thereof are aligned, said hinge pin extending through the eyelets.

9. The tube or pipe clamp of claim 1 wherein the larger diameter section of said first shaft is axially shorter than the smaller diameter section of said first shaft, the smaller inner-diameter segment of said second shaft being axially shorter than the larger inner-diameter section of said second shaft, a free end of said smaller diameter section of said first shaft being in contact with said second shaft at said smaller inner-diameter segment, a free end of said larger inner-diameter section of said second shaft being in contact with said first shaft at said larger outer section, contact between said first shaft and said second shaft occurring only at end regions of said hinge pin.

10. An assembly having a tube or pipe clamp member comprising:
a main section having a substantially semi-circular or semi-cylindrical concave surface facing in a first direction and conforming to an outer tube dimension;
a pair of prongs, extending outwardly from one end of said main section and defining a slot for receiving a shaft of a locking device, said slot being open at free ends of said prongs spaced from said one end of said main section; and
a hinge portion extending outwardly from another end of said main section opposite said prongs,
said assembly further having a hinge pin connected to said hinge portion, said hinge pin including a male pin element and a female pin element, said male pin element having a first shaft and a first head, said first shaft having a stepped outer diameter with a larger diameter section proximate said head, said female pin element having a second shaft and a second head, said second shaft being hollow with a larger inner-diameter section at a free end of said second shaft opposite said second head, said first shaft being inserted into and disposed within said second shaft,
said first shaft having exactly two sections of respective outer diameters including said larger diameter section and a smaller diameter section at a free end of said first shaft, said second shaft having exactly two inner diameter segments including said larger inner-diameter section and a smaller inner-diameter segment on a side of said larger inner-diameter section opposite the free end of said second shaft, said first shaft being formed in an external surface with a groove extending longitudinally over a portion of said larger diameter section and across the smaller diameter section to a free end of said first shaft, said groove allowing an air pressure release which facilitates assembly of the first and second shaft;

wherein said first shaft and said second shaft are free of threading; and wherein said male pin element and said female pin element are secured to one another only by a friction or interference fit and only at said free end of said first shaft and an end opposite said free end of said first shaft and at said free end of said second shaft and an end opposite said free end of said second shaft.

11. The assembly of claim 10 wherein said prongs each have at least one projection on a side facing away from said one of said clamp members, each said projection being disposed proximate the free end of the respective one of said prongs, each said projection taking the form of a nub or truncated tooth.

12. The assembly of claim 11 wherein each said projection is located at a tip of the respective one of said prongs.

13. The assembly of claim 10 wherein the larger diameter section of said first shaft is axially shorter than the smaller diameter section of said first shaft, the smaller inner-diameter segment of said second shaft being axially shorter than the larger inner-diameter section of said second shaft, a free end of said smaller diameter section of said first shaft being in contact with said second shaft at said smaller inner-diameter segment, a free end of said larger inner-diameter section of said second shaft being in contact with said first shaft at said larger outer section, contact between said first shaft and said second shaft occurring only at end regions of said hinge pin.

14. A tube or pipe clamp comprising:

two clamp members pivotably connected to one another at respective hinge-forming ends thereof; and a locking device including a shaft and a locking element operatively attached to said shaft, said shaft being pivotably attached to one of said clamp members, the other of said clamp members having a pair of prongs defining a slot for receiving said shaft so that said locking element is engageable with said prongs to lock said clamp members to one another at ends thereof opposite said hinge-forming ends, further comprising a hinge pin connected to said clamp members at said hinge-forming ends, said hinge pin including a male pin element and a female pin element, said male pin element having a first shaft and a first head, said first shaft having a stepped outer diameter with a larger diameter section proximate said head, said female pin element having a second shaft and a second head, said second shaft being hollow with a larger inner-diameter section at a free end of said second shaft opposite said second head, said first shaft being inserted into and disposed within said second shaft, said first shaft being formed in an external surface with a groove extending longitudinally over a portion of said larger diameter section and across the smaller diameter section to a free end of said first shaft;

wherein said first shaft and said second shaft are free of threading; and wherein said male pin element and said female pin element are secured to one another only by a friction or interference fit and only at said free end of said first shaft and an end opposite said free end of said first shaft and at said free end of said second shaft and an end opposite said free end of said second shaft.

15. The tube or pipe clamp of claim 14 wherein said prongs each have at least one projection on a side facing away from said one of said clamp members, each said projection being disposed proximate the free end of the respective one of said prongs, each said projection taking the form of a nub or truncated tooth.

16. The tube or pipe clamp of claim 14 wherein said hinge-forming ends include eyelet portions juxtaposed so that respective eyelets thereof are aligned, said hinge pin extending through the eyelets.

* * * * *